United States Patent
Brodt

(10) Patent No.: US 9,771,277 B2
(45) Date of Patent: Sep. 26, 2017

(54) METHODS AND SYSTEMS FOR PROCESSING MULTICOMPONENT SOLUTIONS OF MINERAL SALTS

(71) Applicant: S.G.B.D. TECHNOLOGIES LTD., Haifa (IL)

(72) Inventor: Alexander Brodt, Beer Sheva (IL)

(73) Assignee: S.G.B.D. TECHNOLOGIES LTD., Haifa (IL)

(*) Notice: Subject to any disclaimer, the term of this patent is extended or adjusted under 35 U.S.C. 154(b) by 799 days.

(21) Appl. No.: 13/950,328

(22) Filed: Jul. 25, 2013

(65) Prior Publication Data
US 2014/0367347 A1    Dec. 18, 2014

(30) Foreign Application Priority Data

Jun. 13, 2013   (IL) .......................................... 226965

(51) Int. Cl.
*C02F 1/04* (2006.01)
*C02F 1/14* (2006.01)
(Continued)

(52) U.S. Cl.
CPC .............. *C02F 1/04* (2013.01); *B01D 1/0035* (2013.01); *B01D 1/222* (2013.01); *C01D 3/06* (2013.01);
(Continued)

(58) Field of Classification Search
CPC ..... C02F 1/04; C02F 1/08; C02F 1/14; B01D 1/0035; B01D 1/222; C01D 3/06
(Continued)

(56) References Cited

U.S. PATENT DOCUMENTS 3,716,458 A * 2/1973 Greenfield ............... B01D 1/26
                                                    159/13.2
4,077,849 A * 3/1978 Ziehm, Jr. ................ B01D 1/16
                                                    126/634
(Continued)

FOREIGN PATENT DOCUMENTS

CN        2050420    *  1/1990
CN        2050420 U    1/1990
(Continued)

OTHER PUBLICATIONS

M. R. Bloch et al. "Solar Evaporation of Salt Brines", Hebrew University, Industiral and Engineering Chemistry, Jul. 1951, pp. 1544-1553, vol. 43, No. 7.

*Primary Examiner* — Jill Warden
*Assistant Examiner* — Matthew Krcha
(74) *Attorney, Agent, or Firm* — Pearl Cohen Zedek Latzer Baratz LLP

(57) ABSTRACT

An evaporative system for separating solid salt from a saline solution is provided. The system comprises conveyor belts arranged to move the saline solution and evaporate water from it, using natural solar radiation, reflected solar radiation, mechanically induced evaporation and heat storing materials, which accumulate heat during the day and release the heat during the night to allow continuous production. The system may be adapted to different saline solution sources and terrain conditions as well as to varying meteorological conditions. The conveyor belts may be interspaced by separators that remove from the saline solution each type of salt as it solidifies on the corresponding conveyor belt. Conveyor belts may further be used to deliver the solid salt or wastes back to saline solution source.

7 Claims, 3 Drawing Sheets

(51) Int. Cl.
*B01D 1/00* (2006.01)
*B01D 1/22* (2006.01)
*C02F 1/08* (2006.01)
*C01D 3/06* (2006.01)
C02F 103/08 (2006.01)

(52) U.S. Cl.
CPC .................. *C02F 1/08* (2013.01); *C02F 1/14* (2013.01); *C02F 2103/08* (2013.01)

(58) Field of Classification Search
USPC ........................................................ 159/47.1
See application file for complete search history.

(56) References Cited

U.S. PATENT DOCUMENTS

| | | | | |
|---|---|---|---|---|
| 8,408,199 | B1 * | 4/2013 | Klinkman | H01L 31/052 126/571 |
| 2005/0000902 | A1 * | 1/2005 | Newenhizen | B01D 3/346 210/670 |
| 2010/0300848 | A1 * | 12/2010 | Seger | B65G 21/2054 198/842 |
| 2011/0203915 | A1 * | 8/2011 | McClure | B01D 1/0035 203/3 |
| 2014/0123646 | A1 * | 5/2014 | Muren | F24J 2/34 60/641.11 |

FOREIGN PATENT DOCUMENTS

| | | | | |
|---|---|---|---|---|
| DE | 3501505 A1 * | 7/1986 | | ................ C02F 1/10 |
| GB | 1914/10304 A | 0/1915 | | |
| GB | 699215 A | 11/1953 | | |
| KR | 2004/0026409 A | 3/2004 | | |
| KR | 20040026409 | * | 3/2004 | |

\* cited by examiner

A-A

*200*

- 210 — MOVING A SALINE SOLUTION ON A CONVEYOR FROM AN UPSTREAM LOADING REGION TO A DOWNSTREAM UNLOADING REGION
- 215 — USING AT LEAST ONE BELT CONVEYOR WITH EMBEDDED CONTAINERS TO MOVE THE SALINE SOLUTION
- 220 — EVAPORATING WATER FROM THE SALINE SOLUTION DURING THE MOTION
- 222 — ENHANCING EVAPORATION BY SOLAR REFLECTION
- 224 — INCREASING EVAPORATION BY ENHANCING CONVECTION OF THE EVAPORATED WATER
- 230 — REMOVING SOLID SALT FROM THE CONCENTRATED SALINE SOLUTION
- 232 — ARRANGING AT LEAST ONE BELT CONVEYOR TO REMOVE THE SOLID SALT ON AN IDLE ARM THEREOF
- 240 — REPEATING THE MOVING AND THE REMOVING TO SEQUENTIALLY EXTRACT SALTS OF DECREASING SOLUBILITY
- 250 — STORING DAYTIME HEAT AND RELEASING THE STORED HEAT AT NIGHT TIME TO ENHANCE OVERALL EVAPORATION

Figure 3

METHODS AND SYSTEMS FOR PROCESSING MULTICOMPONENT SOLUTIONS OF MINERAL SALTS

CROSS REFERENCE TO RELATED APPLICATIONS

This application claims the benefit of Israeli Patent Application No. 226965, filed on Jun. 13, 2013, which is incorporated herein by reference in its entirety.

BACKGROUND OF THE INVENTION

1. Technical Field

The present invention relates to the field of salt extraction, and more particularly, to evaporative salt extraction.

2. Discussion of Related Art

Saline solutions from seawater contain different types of mineral salts, e.g., halite (NaCl) and carnallite ($KCl.MgCl_2.6H_2O$). Known extraction methods comprise evaporating the saline solution in a cascade of evaporation basins, in which salts of lower solubility (e.g., halite) crystalize in upstream basins while salts of higher solubility (e.g., carnallite) crystalize in downstream basins. The mineral sediments are removed from the basin bottoms for further processing.

SUMMARY OF THE INVENTION

One aspect of the present invention provides an evaporative system for separating at least one solid salt from a saline solution comprising: at least one conveyor unit arranged to move the saline solution from an upstream loading region to a downstream unloading region and further arranged to evaporate water from the saline solution during the motion to yield a concentrated saline solution having a solid salt phase, and at least one separator arranged to receive the concentrated saline solution from the unloading region of the at least one conveyor unit, and to remove the solid salt therefrom.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 3 is a high level schematic flowchart illustrating a salt extraction method according to some embodiments of the invention.

DETAILED DESCRIPTION OF THE INVENTION

Figure 1:
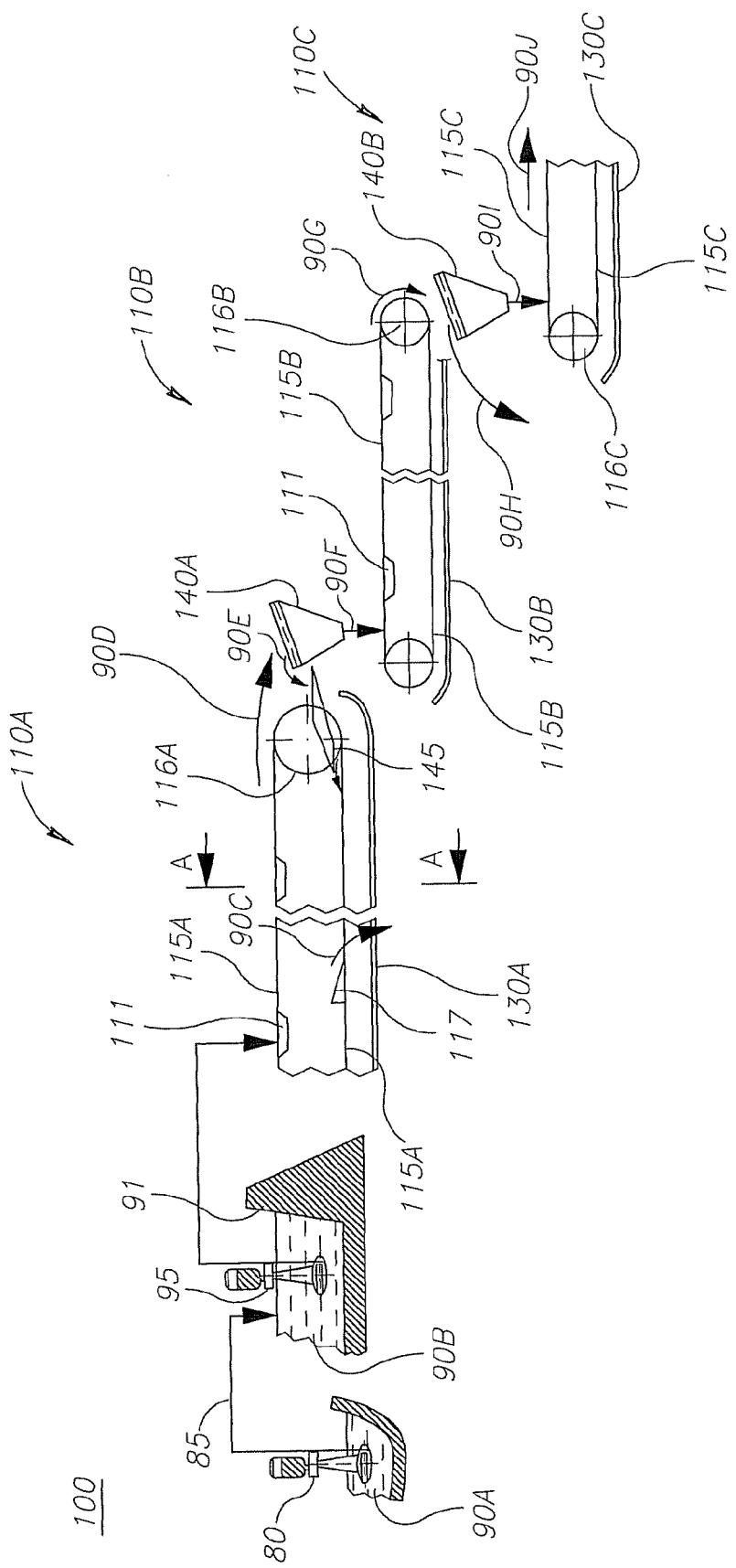
FIG. 1 is a high level schematic illustration of an evaporative system according to some embodiments of the invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Embodiments of the invention comprise an evaporative system for separating solid salt(s) from a saline solution. The system may comprise conveyor belts arranged to move the saline solution and evaporate water from it, using natural solar radiation, reflected solar radiation, mechanically induced evaporation and heat storing materials, which accumulate heat during the day and release the heat during the night to allow continuous production. The system may be adapted to different saline solution sources and terrain conditions as well as to varying meteorological conditions. The conveyor belts may be interspaced by separators that remove from the saline solution each type of salt as it solidifies on the corresponding conveyor belt. Conveyor belts may further be used to deliver the solid salts or wastes back to saline solution source for further processing.

Figure 2:
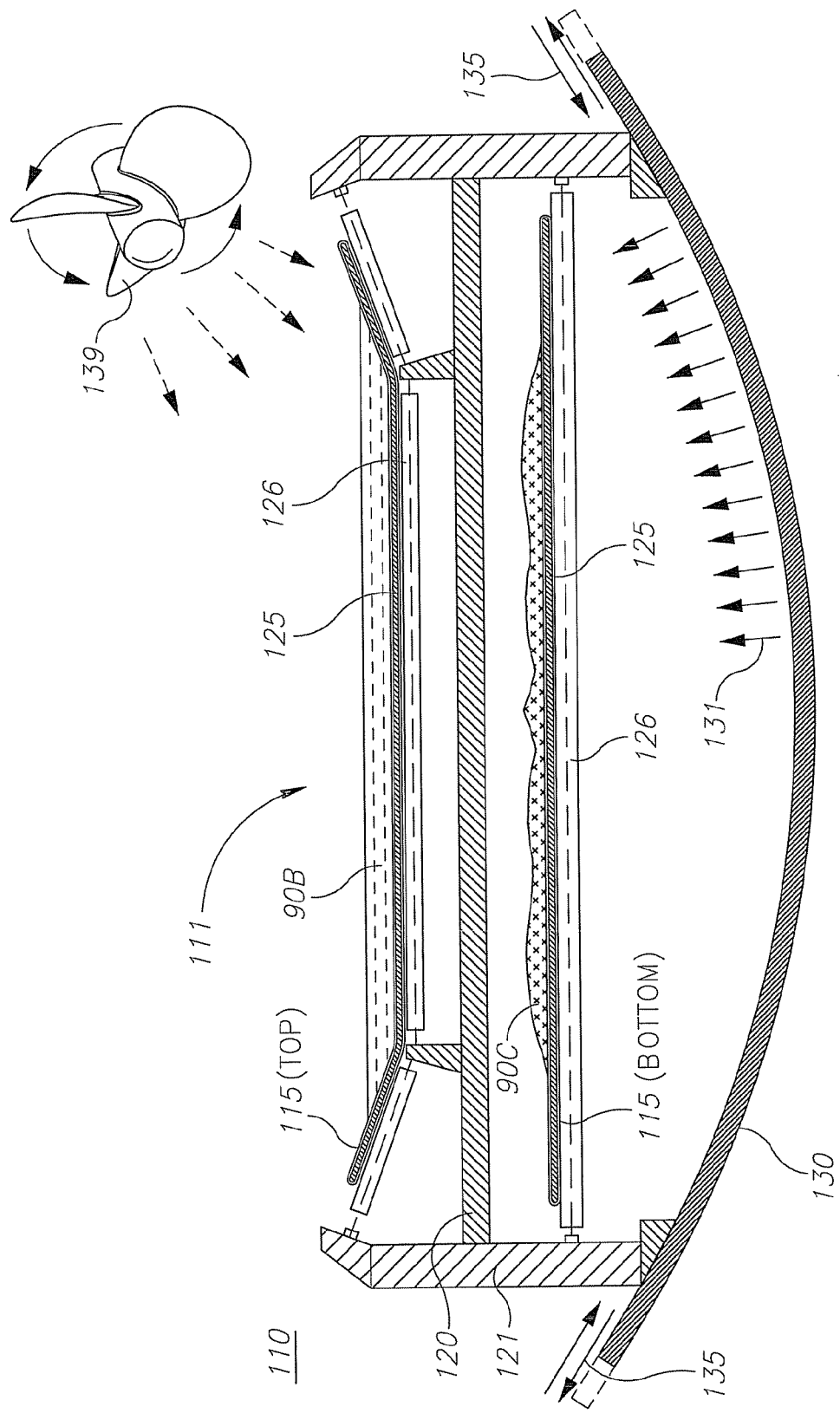
FIG. 2 is a high level schematic cross section illustration of a conveyor unit and a container in the evaporative system according to some embodiments of the invention.

FIG. 1 is a high level schematic illustration of an evaporative system 100 according to some embodiments of the invention. FIG. 2 is a high level schematic cross section illustration of a conveyor unit 110 and container 111 in evaporative system 100 according to some embodiments of the invention.

Evaporative system 100 is arranged to separate at least one solid salt from a saline solution.

Evaporative system 100 may comprise a pump 80 arranged to deliver saline solution 90A such as seawater from a source to a preliminary evaporative basin 91 for initial concentration. For example, the initial brine may be evaporated in open basin 91 under the action of solar radiation up to the state close to supersaturation of the first salt component, but not be brought, however, to the beginning of its crystallization, to avoid salt accumulation in basin 91

Saline solution 90B is then delivered by pump 95 to at least one conveyor unit 110 arranged to move the saline solution from an upstream loading region to a downstream unloading region and further arranged to evaporate water from the saline solution during the motion to yield a concentrated saline solution having a solid salt phase. Along conveyor unit 110, the saline solution undergoes subsequent step-wise precipitation of the extracted components by their successive crystallization owing to additional water evaporation by solar heat. In certain embodiments, the dimensions of conveyor unit 110 may be designed to bring the saline solution at the unloading region in a state of oversaturation to crystalize a salt component as solid salt. Evaporative system 100 further comprises at least one separator 140 arranged to receive the concentrated saline solution from the unloading region of at least one conveyor unit 110, and to remove the solid salt therefrom. The concentrated solution with a solid salt component is a heterogeneous system that may comprise a layer of halite (or other relatively low soluble salt) flooded with water-salt solution supersaturated by sodium chloride (as an example), and not a transparent water-salt solution. In certain embodiments, the low soluble solid salt may be suspended in the concentrated solution.

In the illustrated example, evaporative system 100, for separating at least two solid salts having different solubility levels, comprises conveyor units 110A, 110B, 110C, each arranged to move a salt solution (respectively 90B, 90F, 90I) from an upstream loading region to a downstream unloading region of each conveyor unit 110. Conveyor units 110A, 110B, 110C are further arranged to evaporate water from the salt solution during the motion to yield a concentrated saline solution having a solid salt phase (respectively 90D, 90G, 90J).

In the illustrated example, evaporative system 100 further comprises separators 140A, 140B positioned between any two sequential conveyor units 110 (140A between 110A and 110B; 140B between 110B and 110C) and arranged to remove the solid salt phase (respectively 90E, 9011) from the concentrated saline solution unloaded from an upstream one of the two conveyor units (respectively 110A and 110B) to yield a resulting saline solution (respectively 90F, 90I) and to load the resulting salt solution onto a downstream one of the two conveyor units (respectively 110B and 110C).

For example, separators 140 may receive the concentrated saline solution with solid salt discharged from the unloading region of the preceding conveyor unit, e.g., on a sieving surface of a drainage vibro-shaker with subsequent separation of the mineral salt that crystallized from the liquid phase (solid salt) for disposal or further processing. In certain embodiments, some separation of the solid salt from the concentrated saline solution may be carried out on conveyor units 110 themselves, e.g., by mechanical means such as vibrations. In certain embodiments, oversize product representing waste halite may be transferred by a collector funnel 145 to the idle branch of the same belt moving along a closed contour. The latter removes this product out of the process in the opposite direction and discharges it using a detachable plow 117, e.g., into the source of the saline solution or sends it to other customers.

In certain embodiments, upstream conveyor unit 110 (in FIG. 1, e.g., 110A) is arranged to crystalize a first salt (e.g., halite) having a lower solubility and downstream conveyor unit 110 (in FIG. 1, e.g., 110B) is arranged to crystalize a second salt (e.g., carnallite) having a higher solubility. In certain embodiments, several conveyor units 110 may be dedicated to extract a single type of salt (from solutions having increasing concentrations). Each conveyor unit 110 may be designed according to the solution concentration moved thereby. For example, conveyor units 110 moving more concentrated solutions may be heated more intensively (see below), move more slowly, or have smaller containers 111 (see below).

In certain embodiments, some or all conveyor units 110 may comprise a plurality of containers 111 arranged to evaporate the saline solution. Container 111 may comprise a heat storing material 125 (shown schematically) arranged to store heat during daytime and release the stored heat during nighttime. In certain embodiments, conveyor units 110 may comprise belt conveyors 115 having heat storing material 125 as filler in belt 115. Without being bound by theory, after sunset, the evaporation of solutions on conveyor units 110 does not stop, since the low-melting compositions therein start cooling and release the heat that was accumulated during the daytime to the surfaces of conveyor units 110 and to the saline solutions moved thereby. After cooling down to the melting temperature, the process of heat transfer from such internal heat accumulator material is intensified by the solidification heat of low-melting composition, which generally exceeds the heat stored by the liquid phase. Belt conveyors 115 may be driven by electric drives of driving drums 116, which can be stopped or slowed down according to heat transfer to the saline solution and the crystallization rate.

Generally, evaporative system 100 may comprise a cascade of moving conveyor units 110 to achieve sequential and step-wise precipitation of the entire range of mineral salts to be extracted from the saline solution. For example, conveyor units 110 may comprise horizontal belt conveyors 115 of the respective length with a grooved cross-section forming a closed multi-stage transfer system. To prevent uncontrollable spread of the solution over the entire length of the belt, its working (external) surface may be separated into a continuous row of cells 111 of constant or variable volume by transverse hermetic partitions made, e.g., of the elastic belt material. The grooved cross section defines containers 111 which are thus integrated in belt conveyors 115. The number of stages in the cascade may correspond to the number of mineral salts to be extracted from the initial solution. At the transfer of the contents of each crystallization step to the next step, the technological flow delivered by moving conveyor units 110 (e.g., the moving belt) is separated into solid and liquid phases.

In certain embodiments, salt components crystallized on the working branch of the belt of the first cascade step (90E) is overloaded to its idle branch (illustrated as 90C on bottom 115 in FIG. 2) and removed out of the process in the opposite direction, e.g., by wedges 117.

In an example, conveyor units 110 may comprise black rubber (or another elastomer) belts separated by transverse partitions into hermetic cells (container 111) with heat storing material fillers 125 made of low-melting compositions implanted into the belts. The melting point of the fillers may be lower than the daytime ambient temperature and higher than the night-time temperature. Various low-melting composites, such as paraffins (melting point from 28° C. to 70° C., depending on the composition), tin bromide (melting point 29° C.), Gutri alloy (melting point 47° C.) and other low-melting substances of various chemical nature may be used as fillers 125 for such moving belts forming closed contours. Other types of heat storing material may comprise, e.g., bitumen, tar, wax, stearin, ozokerite, sealing wax, benzophenone, salol and other organic substances with low melting temperature, and low-melting mineral (organic) salts and their eutectic alloys, whose components can be such inorganic (organic) compounds, such as gallium chloride $GaCl_3$, tin and titanium bromides $SnBr_4$ and $TiBr_4$, etc. The following tables illustrate possible heat storing material with respect to their melting points and specific heat of fusion (representing their heat capacitance).

| Material | Melting temperature | Specific heat of fusion |
|---|---|---|
| Geneykozan | 40° C. | 236.4 kJ/kg |
| Spermaceti | 43° C. | 8.8 kj/kg |
| Dokozan | 44° C. | 196.4 kJ/kg |
| Paraffins | 50° C. | 10.5 kJ/kg |
| Wax | 62° C. | 10.1 kJ/kg |
| Bitumen | 70° C. | 126 kJ/kg |

-continued

| Material | Melting temperature | Specific heat of fusion |
| --- | --- | --- |
| $GaCl_3$ | 77° C. | 66.2 kJ/kg |
| $SnBr_4$ | 29° C. | 27.1 kJ/kg |
| $TiBr_4$ | 38° C. | 35.3 kJ/kg |
| $Na_2SO_3 \cdot 7H_2O$ | 33° C. | 179.0 kJ/kg |
| $CaCl_2 \cdot 6H_2O$ | 34° C. | 174.3 kJ/kg |
| $Al(NO_3)_3 \cdot 7H_2O$ | 70° C. | 155.0 kJ/kg |
| $KNaC_4H_4O_6 \cdot 4H_2O$ | 75° C. | 181.4 kJ/kg |
| $CH_3COONa \cdot 3H_2O$ | 58° C. | 272.4 kJ/kg |
| $Na_2CO_3 \cdot 10H_2O$ | 36° C. | 247.6 kJ/kg |

| Composition (metallic eutectic compositions) (component fraction by weight) | Melting point (° C.) |
| --- | --- |
| 95.0% Ga, 5.0% Zn | 25.0 |
| 40.6% Bi, 22.4% Pb, 10.8% Sn, 8.2% Cd, 18.0% In | 26.0 |
| 99.5% Ga, 0.5% Te | 27.0 |
| 44.7% Bi, 22.6% Pb, 8.3% Sn, 5.3% Cd, 19.1% In | 47.0 |
| 49.0% Bi, 18.0% Pb, 12.0% Sn, 21.0% In | 58.0 |
| 51.5% Bi, 24.5% Pb, 12.0% Sn, 12.0% Cd | 60.0 |
| 50.0% Bi, 27.0% Pb, 13.0% Sn, 10.0% Cd | 70.0 |

Any of the above listed materials as well as similar compositions and combinations thereof may be used as heat storing material. In certain embodiments, various salts and oils may be used as heat storing materials.

In certain embodiments, conveyor unit 110 may further comprise a reflective solar system 130 arranged to heat conveyor 110 and/or containers 111.

For example, below conveyor unit 110 (e.g., the moving belts), along their entire length, trough-shaped solar reflectors 130 of parabolic cross-section may be installed. Reflectors 130 may be positioned to heat (by concentrating solar radiation 131) the external surface of the idle branch of belt 115 returning to the head of the process and increase the power of the future heat flow assuring subsequent evaporation of an additional amount of water from the evaporating solution. At the same time, parabolic reflector 130 may be installed with the ability to rotate (135) with respect to a longitudinal horizontal axis of conveyor unit 110.

In certain embodiments, at least one of conveyor units 110 further comprises a fan 139 arranged to enhance water evaporation.

Advantageously, system 100 not only substantially intensifies the solar evaporation process due to multiple thinning of the evaporated solution layer on belts 115 in comparison with its level in prior art evaporation basins, but also combines the crystallization and delivery processes of the valuable mineral salts. At the same time, the use of the idle branch of moving belt 115, at least of the first crystallization stage 110 for the withdrawal of waste products 90C or other solids (e.g., 90H) out of the process also substantially simplifies the transport aspect of the evaporative process and enhances the linear nature of the process and ecological cleanness, in addition to avoiding use of a cascade of evaporation basins and the flooding of immense areas.

In certain embodiments, conveyor units 110 may be designed according to the required productivity (e.g., width of belts 115 and size of containers 111 may be designed according to specifications) as well as according to terrain parameters such as slope steepness and the length of lateral rollers restricting the possibility of transverse displacement of the belts. Belt size may be adapted to each stage of the cascade, for example, the belt width of each subsequent stage of the cascade may be smaller that of the preceding crystallization stage. The velocity and route length of conveyor units 110 may be designed to control the duration of the solution crystallization process. In particular the motion speed of conveyor units 110 (e.g., the rotation speed of driving drums 116) may be dynamically changes according to meteorological conditions (e.g., evaporation conditions and solar radiation) and evaporative efficiency. In certain embodiments, fans 139 may also be activated according to evaporative conditions to regulate evaporation speed. For example, driving drums 116 may rotate quickest during the hottest time of the day and slow down with decreasing heat supply to maintain a required salt separation level. Fans 139 may be operated particularly at night, to enhance evaporation.

FIG. 3 is a high level schematic flowchart illustrating a salt extraction method 200 according to some embodiments of the invention.

Method 200 comprises moving a saline solution on a conveyor from an upstream loading region to a downstream unloading region (stage 210) to evaporate water from the saline solution during the motion (stage 220) to yield a concentrated saline solution having a solid salt phase, and removing the solid salt from the concentrated saline solution (stage 230) to yield a resulting saline solution. In certain embodiments, method 200 further comprises repeating the moving (stage 210) and the removing (stage 230) to sequentially extract salts of decreasing solubility (stage 240).

In certain embodiments, method 200 may comprise using at least one belt conveyor with embedded containers to move the saline solution (stage 215).

In certain embodiments, method 200 may further comprise storing daytime heat and releasing the stored heat at night time to enhance overall evaporation (stage 250), e.g., by incorporating a heat storing material to be in contact with the saline solution during its movement.

In certain embodiments, method 200 further comprises enhancing evaporation by solar reflection (stage 222) and/or increasing evaporation by enhancing convection of the evaporated water (stage 224).

In certain embodiments, method 200 further comprises arranging at least one of the belt conveyors to remove the solid salt on an idle arm thereof (stage 232).

EXAMPLE

In the following non-limiting example, embodiments of the invention are presented which are operable in processing Dead Sea water as the initial saline solution. Such initial saline solution comprises 8.72% NaCl; 1.16% KCl, 13.55% $MgCl_2$; 3.40% $CaCl_2$; 0.44% $MgBr_2$. One of conveyor belts 115A may be designed to crystalize and remove halite (as 90E), while another of conveyor belts 115B may be designed to crystalize and remove carnallite (as 90H). A third conveyor belt 115C may be further concentrated e.g., using bromine to crystalize bromocarnallite $KBr.MgBr_2.6H_2O$ and bromobischofite $MgBr_2.6H_2O$ (magnesium bromide hexahydride) from salt composition 90J. Even if this brine cannot be brought to bromic salts crystallization, its additional evaporation allows a drastic reduction of power consumption for further extraction of elementary bromine out of such a concentrated source.

Advantageously, the disclosed systems and methods do not have the limitations of common practices, in which basins get filled up with sediments, and continuously new basins must be constructed. Moreover, according to present methods, large basins are preferred over smaller ones, because larger basins get filled more slowly, leading to extensive environmental destruction and process inefficiency. Large basins present however extensive transportation and processing challenges, which further increase the environmental impact of salt extraction. Hence, by adopting the presented systems and methods, large scale environmental destruction is avoided.

Advantageously, system 100 and method 200 intensify the process of brine processing without mechanical loss of the initial mineral with a simultaneous decrease in power consumption, reduced areas allotted for basin salt-works and smaller harmful effect on the environment with respect to other methods of salt production.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented In certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A salt extraction method comprising:
    moving a saline solution on a conveyor from an upstream loading region to a downstream unloading region to evaporate water from the saline solution during the motion to yield a concentrated saline solution having a solid salt phase, wherein evaporating is carried out in at least one embedded container of the conveyor by at least one of: a heat storing material arranged to store heat during daytime and release the stored heat during nighttime; and a reflective solar system arranged to heat the at least one container, and
    removing the solid salt from the concentrated saline solution to yield a resulting saline solution.

2. The method of claim 1, further comprising repeating the moving and the removing to sequentially extract salts of decreasing solubility.

3. The method of claim 1, further comprising storing daytime heat and releasing the stored heat at night time to enhance overall evaporation.

4. The method of claim 1, further comprising enhancing evaporation by solar reflection.

5. The method of claim 1, further comprising increasing evaporation by enhancing convection of the evaporated water.

6. The method of claim 1, further comprising using at least one belt conveyor with embedded containers to move the saline solution.

7. The method of claim 1, further comprising arranging at least one of the belt conveyors to remove the solid salt on an idle arm thereof.

* * * * *